DEVICE FOR GENERATION OF A SELF-ACTING FLUID BEARING

Filed April 18, 1968 2 Sheets-Sheet 1

INVENTOR
DONALD D. MAXSON
BY Edward J. Norton
ATTORNEY

Oct. 20, 1970 D. D. MAXSON 3,534,893

DEVICE FOR GENERATION OF A SELF-ACTING FLUID BEARING

Filed April 18, 1968 2 Sheets-Sheet 2

INVENTOR
DONALD D. MAXSON

BY Edward J Norton
ATTORNEY

United States Patent Office 3,534,893
Patented Oct. 20, 1970

3,534,893

DEVICE FOR GENERATION OF A SELF-ACTING FLUID BEARING

Donald D. Maxson, Yardley, Pa., assignor to RCA Corporation, a corporation of Delaware Filed Apr. 18, 1968, Ser. No. 722,246
Int. Cl. B65h *23/24*
U.S. Cl. 226—97 9 Claims

ABSTRACT OF THE DISCLOSURE

A construction technique for generating and sustaining a lubricating fluid bearing between two moving objects as for example in a tape recording apparatus in which a recording tape passes over a guiding structure such as a rotating drum and where minimum friction and maximum tape stability are desired. A series of contoured depressions are disposed in the peripheral surface of the drum which are configured to entrain the recording medium on a fluid layer between it and the drum when the drum is rotated at a high speed relative to the adjacent tape medium.

In recording apparatus it is often advantageous to utilize fluid bearings between the recording medium and the guide members in order to reduce friction. This technique finds particular application in video recorders having a tape transport, in which a magnetic recording tape passes in a helical fashion around a rotating drum. Although the present invention is particularly applicable in such recorders and therefore will be described in reference to them; it is to be understood that the principles of the present invention may be utilized in web transport devices generally.

In the recording of video or other high frequency information on magnetic tape, for example, a number of techniques employing movable or rotating magnetic heads are presently in use. One of these techniques is generally referred to as helical scan recording. Where this technique is employed, the tape on which the signal is to be recorded is passed about a cylindrical drum in a helical manner. With this arrangement, means must be employed to reduce friction between the tape and drum and stabilize the tape movement.

It is common in the art to cope with the friction and stability problems by providing a fluid bearing, which is usually air, between the drum and the tape. Many techniques exist for providing the fluid bearing and, while most accomplish satisfactory performance, they require elaborate means which increase cost and present fabrication and operation problems. Typically the circumference of the drum contains a series of apertures through which the fluid is forced by a positive pressure system. This positive pressure system requires a separate fluid pressure source and elaborate ducts or some other means within the drum for forcing air into the drum interior and out through the apertures.

It is therefore an object of the present invention to provide a simple and effective means of providing a fluid bearing between the drum and recording medium.

It is a further object of the present invention to provide a guide surface construction which effects a highly efficient fluid bearing for use in a system where a web passes over the guide surface.

Briefly the above objects are accomplished by provision of a drum having a continuous peripheral surface with a series of contoured depressions therein. These depressions are configured to cause a fluid layer to be established about the drum between the recording medium and the drum surface when the drum is rotated in a given direction.

Thus a fluid bearing is created by the interaction of the surface contours of the drum with the surrounding fluid medium when the drum is rotated without the use of auxiliary pressure means or provision for a fluid supplied from within the drum.

A more detailed description of the present invention will be given with reference to the accompanying drawings in which.

Figures 4A, 4B, 4C:
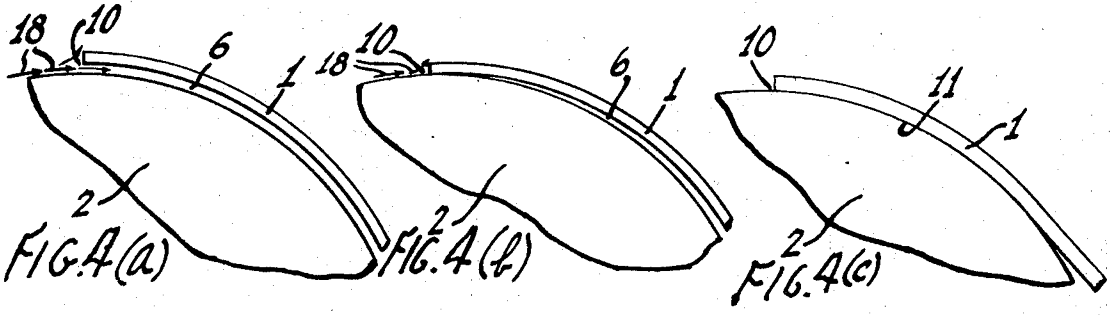

FIGS. 4*a–c* are end views of a fluid bearing arrangement which does not include the present invention.

Figure 5:
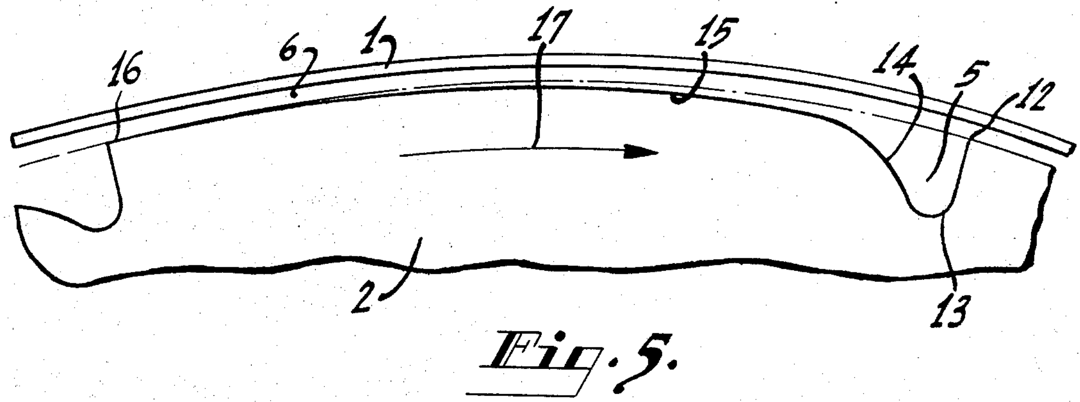

FIG. 5 is an expanded side view of a portion of a drum construction utilizing the principles of the present invention.

Figure 1:
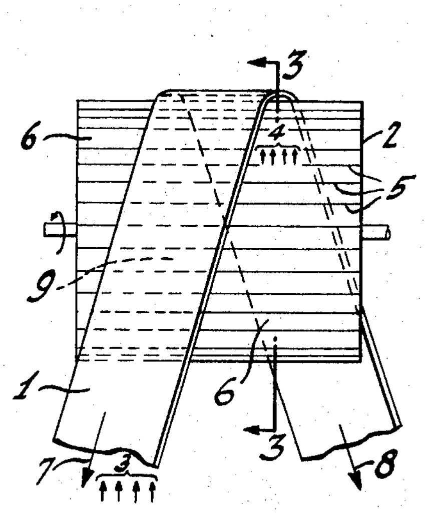
FIG. 1 is one view of a fluid bearing arrangement according to the present invention.
Figures 6, 7A, 7B, 7C, 7D, 8A, 8B, 8C:
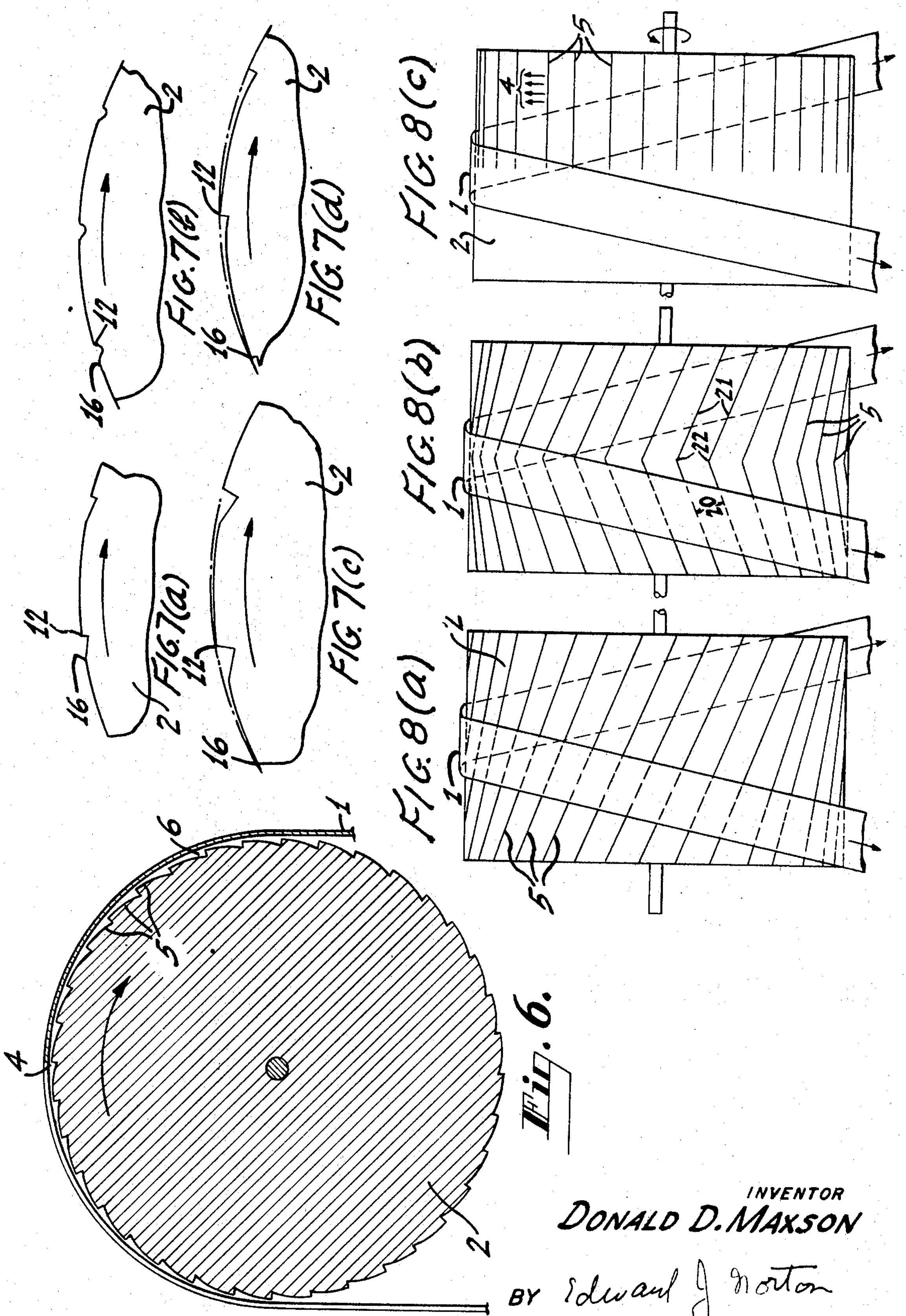

FIG. 6 is an enlarged sectional view of the arrangement of FIG. 1 taken through plane 3—3.

FIGS. 7*a–d* are further expanded side views of a portion of a drum construction utilizing the principles of the present invention.

FIGS. 8*a–c* are pictorial representation of further fluid bearing arrangements according to the present invention.

If reference is made to FIG. 1, there is shown one view of a tape guiding arrangement that may be employed in a helical scan tape recorder wherein a tape 1 is wrapped in a helical manner partially around a rapidly rotating cylinder or drum 2 in the presence of a fluid medium 6 which surrounds the cylinder 2. In such an arrangement a suitable drive means, not shown, is provided which causes the cylinder 2 to rotate at a high angular speed. A tape transport, not shown, is also provided to move the tape 1 relative to the surface of drum 2 and to create tension in the tape 1, denoted by arrows 7 and 8, so that it is disposed adjacent to the surface of the drum 2. In the described arrangement the speed of the drum 2 is made much greater than the speed of the tape medium 1. The reference numeral 3 of FIGS. 1 and 2, denote the region of smooth convergent entrance for fluid entrainment of a portion of the tape medium 1. The reference numeral 4 of FIGS. 1 and 3 denote the region of abrupt fluid entrance which condition persists for the remaining portion of the path of tape 1 about drum 2. The wide convergent entrance region 3 produces a satisfactory sustaining fluid bearing under the following portion of tape 1 in the region 9. However in the absence of the utilization of the principles of the present invention the abrupt fluid entrance region 4 causes an undesirable condition which can best be explained by reference to FIGS. 4*a–c*. FIGS. 4*a–c* are an enlargement of the abrupt entrance region 4 of a drum and tape arrangement not employing the principles of the present invention. The arows 18 of FIG. 4*a* indicate that a portion of the fluid medium 6 is lost at the sharp entrance point 10. FIG. 4*b* illustrates a collapse of the entrance point 10 that can result from excessive entrance losses or imperfections in tape medium 1. FIG. 4*c* illustrates the rapid progression of the depletion of fluid medium 6 under the following portion 11 of tape 1. Closing off the fluid entrance 10 for even a small portion of tape 1 causes the low pressure area 10 to propagate wherein external fluid pressure augmented by the inward acting vectors of the tape 1 tension cause excessive friction between the tape 1 and drum 2. The resulting grabbing of tape 1 is violent in nature and can cause breakage of tape 1 or stoppage of the rotation of drum 2.

According to the principles of the present invention, the drum 2 of FIG. 1 has a continuous peripheral surface which contains a series of longitudinal depressions indicated by reference numeral 5. The expanded side view of the drum 2 in FIG. 5 shows the depressions 5 in profile and more clearly discloses the nature of a preferred embodiment of the depressions 5 of the drum 2. Each of the depressions 5 comprises a leading edge 12 and a trailing edge 16 formed at the outer periphery of the drum 2 and a recessed asymmetric contour 13 between the first two portions. According to the convention adopted herein, the leading edge 12 is that edge which is antepositioned so as to proceed ahead to the right as the drum 2 is rotated in the direction indicated by arrow 17. The trailing edge 16 is that portion of depression 5 that follows in the rotational direction indicated by arrow 17. As shown in FIG. 5, the surface depressions 5 of drum 2 are a sequence of contiguous curves consisting of a sharp cornered leading edge 12, an abrupt relatively deep inward extending cavity 13, a smooth uninterrupted contour 14 in the rise portion and a ramp like contour 15 following the rise curve 14. The cavity depth is typically small relative to the drum diameter and for example the cavity may be .002 inch at its deepest portion in a drum having a diameter of 8 to 10 inches.

The sharp corner leading edge 12 performs a function analogous to the abrupt stern of a planing hull boat in that a sharp stern will break free while a curved stern will suck down. Thus the sharp corner 12 will allow the tape to break free from the peripheral surface of the drum 2. The cavity 13 serves multiple functions. First it enhances windage of the rotating cylinder 2. It also prevents the spread of any tape grabbing tendency by furnishing relatively large quantities of fluid for relief of a condition tending to establish a vacuum. The relatively deep cavity 13 also serves as an effective trap for dust and other foreign particles present between the tape 1 and the drum 2. The smooth rise portion 14 serves to direct the fluid under the approaching portions of the tape 1 by behaving in a manner analogous to the front edge of an airplane wing. The ramp like portion 15 of the depression 5 has proven effective in improving tape flotation by compressing the fluid near the trailing edge 16 which in turn lifts the tape 1 for improved entrance conditions for the following depression. The ramp like portion 15 also serves to spread the air film in a direction parallel to the tape edges so as to minimize the total number of depressions required for a particular application.

The operation is now considered particularly with reference to the sectional view of FIG. 6 which is through the abrupt air entrance region 4. The contoured depressions 5 of the drum 2 when it is rotated in the indicated direction cause the formation of a continuous and self sustaining fluid medium bearing layer 6 to be established between the tape 1 and the surface of the drum 2. The substantial speed difference between the tape 1 and drum 2 facilitates operation of the invention where the tape 1 is moving either in the same direction or opposite to the direction of rotation of the drum 2. The establishment and perpetuation of the fluid bearing causes the tape 1 to be entrained on the fluid medium 6 thereby reducing friction, stabilizing the tape and in particular preventing a collapse at the critical abrupt entrance region 4. This in turn avoids grabbing of tape 1 and binding of the drum 2.

All four of the contour features of the depressions 5 shown in FIG. 5 are not required for all applications. If reference is made to FIGS. 7*a–d* there are shown other preferred arrangements of the contours of the depressions 5. The sharp cornered leading edge 12 is deemed mandatory and is included in all of the configurations of FIG. 7. FIGS. 7*a–d* show modifications of the basic shape which will work well for lightly tensioned tape or in cases where some surface friction is tolerable providing a heavy grab condition is avoided. FIG. 7*a* shows simple V notches in conjunction with the sharp cornered leading edge 12. The depressions of FIG. 7*b* comprise the sharp corner leading edge 12 and a tangential rising contour. The arrangement of FIG. 7*c* employs the sharp leading edge 12 with V notches and a ramp like contour. The depressions of FIG. 7*d* comprise simply the sharp cornered leading edge 12 with a ramp like contour. It is to be noted that the trail edge 16 of the depressions may be arranged to either coincide with the leading edge 12 of the succeeding depression as shown in FIGS. 5 and 7*c–d* or be noncoincident with the succeeding leading edge 12 as shown in FIGS. 7*a–b*.

Figure 2:
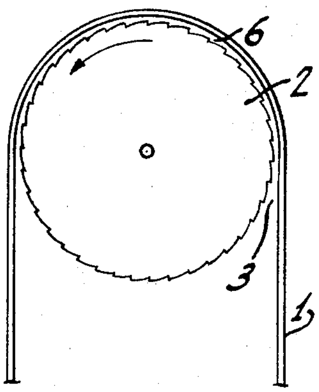
FIG. 2 is an end view of the drum and tape arrangement of FIG. 1 taken in the direction of the left side of FIG. 1.
Figure 3:
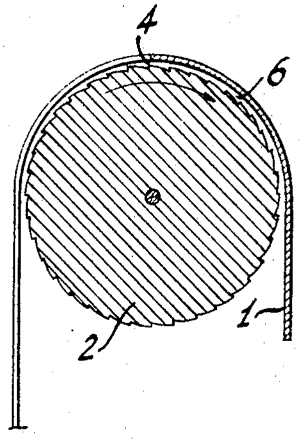
FIG. 3 is a sectional view showing the relation of the drum and tape of FIG. 1 taken through plane 3—3.

It is not imperative that the depression contours exist in the wide convergent air entrance region 3 shown in FIGS. 1 and 2 but extension of the depressions across the entire longiutdinal extent of the drum results in a more uniform thickness fluid bearing over the entire bearing surface and provides a constant helix angle of the tape 1.

If reference is made to FIGS. 8*a–c* there are shown alternative embodiments of the orientation and extent of the depressions 5 of drum 2 with respect to the tape 1. In the embodiments of FIG. 8 the drum 2 may be operably rotated in either direction, however the orientation of the profile of the projections 5 must be such that the sharp cornered leading edges proceed ahead in the direction in which the drum 2 is rotating. In FIG. 8*a* the depressions are coextensive with the longitudinal axis of the drum 2 but are disposed in a helical or skewed manner about the drum 2 with respect to its axis of rotation. In FIG. 8*b* the depressions 5 are again coextensive with the longitudinal axis of the drum 2 but consist of two sloped portions 20 and 21 which are oppositely sloped with respect to the axis of rotation of drum 2. The sloping portions 20 and 21 of each depression 5 intersect at points 22. The points 22 defining an annular path about the drum 2 normal to its axis of rotation so as to form a V or herringbone patern of the depressions 5. The depressions 5 of FIG. 8*c* are disposed about the drum in a manner parallel to the longitudinal axis but extend only partially across the drum and are preferably in the region of abrupt air entrance 4.

It will be obvious to those skilled in the art to utilize ocmbinations of the various shapes of depression contours, their orientation and extent including those specifically disclosed herein for particular applications without departing from the spirit and scope of the present invention.

What is claimed is:

1. A rotatable drum for use where a moving record medium passes around a portion of the periphery of said drum, said drum having a continuous peripheral surface with a plurality of depression means therein, said depression means being configured with an asymmetric contour to entrain said record medium on a fluid medium about the surface of said drum when said drum is rotated.

2. A rotatable drum, surrounded by a fluid medium, for use where a moving tape passes around a portion of the periphery of said drum in a direction non-perpendicular to the axis of rotation of said drum; said drum having a continuous surface with a plurality of depression means therein, said depression means having first and second edges, and a recessed asymmetric contour therebetween, said depression means causing said tape to be suspended on said fluid medium about the surface of said drum when said drum is rotated.

3. The drum according to claim 2 wherein: said depression means are coextensive with the axis of rotation of said drum.

4. The drum according to claim 2 wherein: said depression means extend parallel to the axis of rotation of said drum.

5. The drum according to claim 2 wherein: said depression means extending longitudinally of said drum and are disposed in a helical manner about said drum with respect to its axis of rotation.

6. The drum according to claim 2 wherein: said depression means have first and second slopes with respect to the axis of rotation of said drum, the intersection of said slopes defining points which extend annularly about said drum normal to its axis of rotation.

7. A rotatable drum for use where a moving tape passes around a portion of the periphery of said drum in a direction non-perpendicular to the longitudinal axis of rotation of said drum; said drum having a continuous peripheral surface with a plurality of depressions therein, said depressions constituting in respect of the direction of rotation of said drum, a sharp cornered leading edge, a recessed asymmetric contour and a trailing edge.

8. The drum according to claim 7 wherein: said recessed asymmetric contour has a profile consisting of an abrupt inward extending cavity commencing at said first edge and a contiguous outward sloping figuration terminating at said second edge.

9. A rotatable drum for use in a helical scan magnetic recorder where a moving tape traverses a portion of the periphery of said drum; said drum having a continuous peripheral surface with a plurality of depression means therein, said depression means having first and second edges, each of said edges defining points of the outermost periphery of said drum and a recessed asymmetric contour between said edges.

References Cited

UNITED STATES PATENTS

| | | | |
|---|---|---|---|
| 3,398,870 | 8/1968 | Mullan et al. | 226—97 |
| 3,405,855 | 10/1968 | Daly et al. | 226—97 X |
| 3,258,184 | 6/1966 | Altobelli et al. | 226—95 |

ALLEN N. KNOWLES, Primary Examiner

U.S. Cl. X.R.

226—193, 196; 308—9